United States Patent Office 3,592,679
Patented July 13, 1971

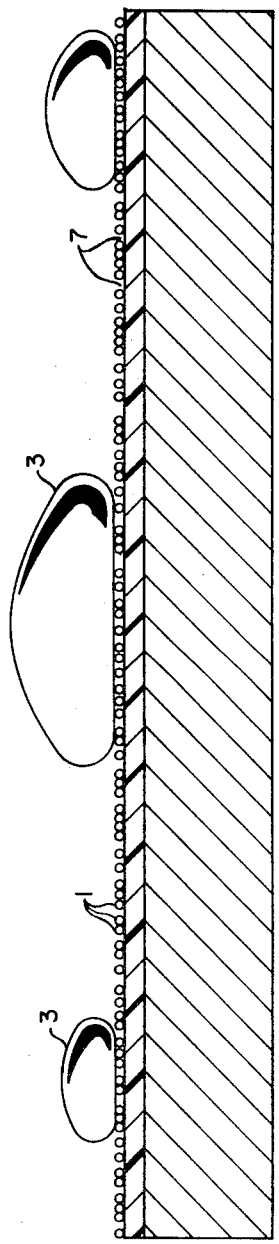

3,592,679
SURFACE TREATMENT OF POLYMERIC MATERIALS
Paul R. Tully, Lowell, William J. Fletcher, Saugus, and Hector Cochrane, Groveland, Mass., assignors to Cabot Corporation, Boston, Mass.
Filed May 29, 1969, Ser. No. 828,972
Int. Cl. B44d 5/02, 5/03
U.S. Cl. 117—38
15 Claims

ABSTRACT OF THE DISCLOSURE

Said polymeric materials are rendered water-repellent by applying to the surface thereof certain colloidal metal or metalloid oxides.

THE PRIOR ART

In Iler's U.S. Pat. No. 2,733,160 there is disclosed a method for treating colloidal porous silicas so as to render same hydrophobic. Said method entails the effectuation of reaction between bound hydroxyl groups on the surface of colloidal porous silicas and aliphatic alcohols thereby producing "estersils." Such a reaction is typified as follows:

There are additionally disclosed various substrate materials such as textiles, natural and synthetic fibers, metals, ceramics and paper which are treated with the estersil products for various purposes. Accordingly, estersils are disclosed as useful in lubricating metal surfaces, frictionizing natural and synthetic textile fibers, imparting wet strength properties to papers and waterproofing ceramics. Unfortunately, however, solid polymeric materials which have been treated with the estersils of Iler, are normally not substantially water-repellent or do not normally retain this beneficial character for useful periods of time. In accordance with the present invention, however, this last problem has been substantially resolved.

OBJECTS OF THE INVENTION

It is a principal object of the invention to provide novel water-repellent solid polymeric materials.

It is another object of the invention to provide water-repellent latex paint films having good vapor transmission properties.

It is still another object of the present invention to provide a method for controlling the water solubility of normally water soluble solid polymeric materials such as polyvinylpyrrolidone and polyvinyl alcohol.

Other objects and advantages of the present invention will in part be obvious and will in part appear hereinafter.

GENERAL DESCRIPTION OF THE INVENTION

In accordance with the present invention it has been discovered that said polymeric materials are rendered water-repellent by treatment thereof with substantially nonporous colloidal metal or metalloid oxides which have been reacted with organosilicon compounds so as to form chemically bound surface structures conforming to the formula:

$$Z\text{—}O\text{—}SiR_aX_b$$

wherein Z represents the metal or metalloid oxide surface; each R is an alkyl, alkoxy, aryloxy, aryl, alkylaryl, arylalkyl, alkylaryloxy, or arylalkoxy group; $a$ is an integer from 2 to 3; each X is a halogen or hydroxyl group; $b$ is an integer from 0 to 1 and $a+b=3$.

DETAILED DESCRIPTION OF THE INVENTION

The colloidal oxides useful in the practice of the invention can generally be any metal or metalloid oxide having an average ultimate particle diameter of less than about 0.5 micron and preferably less than about 0.1 micron. In order that the particulate metal or metalloid oxide be rendered substantially permanently hydrophobic by a chemisorption reaction thereof with the organosilicon compound, which reaction will be discussed in more detail below, it is of further importance that said starting oxide material bear on the surface thereof at least about 0.25 milliequivalent per gram and preferably above about 1.0 milliequivalent per gram of hydroxyl groups. Specific examples of suitable available starting material oxides are: pyrogenic and precipitated silicas, titania, alumina, zirconia, vanadia, chromia, iron oxide, silica/alumina, etc.

Additionally, it is highly desirable that the oxide be relatively-non-porous, i.e. that the preponderance of the total surface area thereof be external rather than internal (pore volume). The relative porosity of a given colloidal particulate solid can be determined by (1) calculating the surface area thereof predicated upon the average particle diameter (such as visually determined by electron micrographic analysis) and assuming no porosity; (2) experimentally determining the actual total surface area by the well known BET—$N_2$ adsorption method. Accordingly, the porosity of the particulate solid is expressed as follows:

$$\text{Percent porosity} = \frac{\text{BET} - N_2 \text{ S.A.} - \text{E.M. S.A.}}{\text{BET} - N_2 \text{ S.A.}} \times 100$$

For the purposes of the present invention, those particulate colloidal metal or metalloid oxides having a difference between the calculated (electron micrographic) and BET—$N_2$ surface areas which represents less than about 10% of the BET—$N_2$ surface area are to be considered relatively non-porous. Due principally to the above porosity consideration as well as their normally relatively high hydroxyl group population and availability, pyrogenic and precipitated silicas are starting materials of choice.

Pyrogenic silicas are generally defined as those silicas produced by the oxidation and/or hydrolysis at high temperature (above about 800° C.) of a silicon compound such as silicon tetrachloride, silicon disulfide, silicon monoxide and the like. Further details of pyrogenic silica producing processes can be had by reference to U.S. Pat. Nos. 2,428,178; 2,990,249; 3,043,062; 3,203,759; 3,416,980; 3,130,008; 3,086,841 and 3,024,089.

The precipitated silicas are produced by the acidulation or neutralization of an aqueous alkali metal silicate solution. Said acidulation or neutralization results in precipitation of a silica hydrosol from solution which is then aged to a gel or semi-gel state, washed free of alkali metal salts, dried and ground to a colloidal nongelatinous impalpable powder. Further details relating to various permutations of the generalized precipitated silica process outlined above can be had by reference to U.S. Pats. 2,865,777; 2,900,348; 2,913,419; 2,995,422; 3,010,791; 3,034,913; 3,172,726; 3,250,594.

The art of treatment by reaction of metal oxides and metalloid oxides, particularly colloidal silicas, with various organosilicon compounds has been rather extensively developed. Accordingly, suffice it to say that various organosilicon compounds bearing one or two functional moieties/molecule can be reacted through said functional moieties with hydroxyl groups existing on the surface of metal oxides or metalloid oxides. The resulting reaction product is characterized as a metal oxide or metalloid oxide having chemically bonded to the surfaces thereof organosilicon constituents or groups represented generally by the formula:

$$ZO\text{—}SiR_aX_b$$

wherein Z represents the oxide surface; O is oxygen; Si is silicon; each R is any alkyl, aryl, arylalkyl, alkylaryl, alkoxy, aryloxy, alkylaryloxy or arylalkoxy group; $a$ is an integer of from 2 to 3; each X is a halogen or hydroxyl group; $b$ is an integer from 0 through 1; and $a+b=3$. In the practice of the present invention it is preferred that $a$ in the above formula be 3.

Specific examples of organosilicon compounds which can be reacted with the colloidal oxides useful in the invention are: organohalosilanes such as $(CH_3)_3SiCl$, $(CH_3)_2SiBr_2$, $(CH_3)_2SiCl_2$, $(C_4H_9)_3SiCl$; organosilylamines such as $(CH_3O)_3Si(CH_2)_3NH(CH_2)_2NH_2$, $$(CO_3O)_2(CH_3)SiCH_2CH(CH_3)CH_2NHCH_2CH_2NH_2$$

organodisilazanes such as $(CH_3)_3SiNHSi(CH_3)_3$ and $(CH_4H_9)_3SiNHSi(C_4H_9)_3$, etc. We have further found that organodisilazane treated oxides are particularly advantageous to utilize in the present invention due to their generally superior hydrophobic properties. Said organodisilazane compounds conform to the general formula:

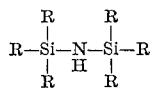

These organodisilazane compounds can be reacted with bound hydroxyl groups on the metal or metalloid oxide surface over a broad temperature spectrum ranging from substantially below room temperature to the decomposition temperature of the particular organodisilazane compound employed in accordance with the following equation:

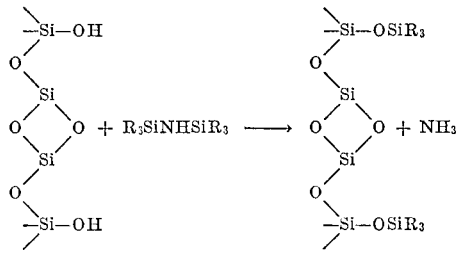

Further details concerning various specific processes for reacting colloidal metal and metalloid oxides with organosilicon compounds can be had by reference to the following U.S. Patent literature: 2,520,661; 2,589,705; 2,705,206; 2,705,222 and 3,023,181.

In any case, it is important that the organosilicon compound treatment of the colloidal oxide provide a product bearing at least about .5% by weight of the untreated oxide of the above defined organosilicon surface structures chemically bonded to the oxide surface. Preferably, said organosilicon surface structures form at least about 4% by weight of the metal or metalloid oxide base material.

In general, any solid or rubbery polymeric material can be treated in accordance with the above-described surface modified metal or metalloid oxides. Accordingly, natural and synthetic plastomers and elastomers, thermoplastic, thermoset and chemoset resins are all included within the scope of suitable intended solid polymeric materials. Specific examples of such suitable polymeric materials are acrylonitrile-butadiene-styrene copolymer; polymethylmethacrylate; methyl methacrylate α-methyl styrene copolymer; polydiallyl phthalate; polyethylene; ethylene-vinyl acetate copolymer; polypropylene; polybutene; ethylene-propylene copolymer; ethylene-ethylene acrylate copolymers; casein resin; ethyl cellulose polymer; cellulose acetate polymer; cellulose propionate polymer; cellulose acetate-nitrate copolymer; chlorinated polyesters, bisphenol/epichlorohydrin epoxy resins; phenol novalac epoxy resins; cycloaliphatic epoxy resins; fluorocarbon polymers such as polychlorotrifluoroethylene, polytetrafluoroethylene, polyvinylidene fluoride; polyfurans; aldehydric and/or phenolic resins such as polyacetal, urea-formaldehyde, melamine-formaldehyde phenol-furfural; polycarbonates; polyesters or alkyd resins such as produced by reaction of unsaturated or saturated dibasic acids and acid anhydrides with polyhydric alcohols; polyamides; polyimides; polysulfones; natural rubber; butyl rubber; chloroprene rubber; isoprene rubber; silicone rubber; SBR, nitrile rubber; isobutylene rubber; EDP; polyurethane rubber; natural gums and latices such as shellacs, varnish resins, drying oils and the like.

Additionally, it should be noted that colorants, pigments, reinforcing agents, anti-oxidants, plasticizers, extenders, insecticides, fungicides, stabilizers, etc., can also form part of the polymeric materials to be treated in accordance with the instant invention.

Further, the particular physical shape of the solid polymeric materials to be treated is not considered a critical parameter with respect to the invention. Accordingly, films, sheets, extruded, blow molded, powder molded, injection molded, vacuum formed, drape molded or solution cast polymeric material wares may be beneficially rendered substantially water-repellent by the treatment of our invention. It should be noted that the term, "solid polymeric material" is to be construed as specifically including lacquer, paint, enamel, varnish or shellac films as commonly defined within the painting arts. In this context, a specific application of the present invention resides in the treatment of substantially dried or cured paint films. For instance, one of the problems commonly associated with the use of white or lightly pigmented exterior acrylic latex paints in house painting resides in the tendency of the freshly dried or cured paint film to be detrimentally stained by water borne color bodies. As will be demonstrated in one of the examples forming part hereof, said tendency can be markedly reduced by treatment of such paint films with the hydrophobic metal or metalloid oxides described hereinbefore.

The amount of hydrophobic oxide to be applied to the surface of the solid polymeric material is subject to considerable variation and can best be determined experimentally for each particular circumstance. In establishing general guidelines, however, we have found that the desired degree of water-repellency to be imparted, the extent and type of organosilicon compound treatment of the oxide utilized and the particular metal or metalloid oxide starting material should be taken fully into account in determining the concentration of treated colloidal oxide to be applied to the solid polymeric material. For instance, as mentioned hereinbefore, oxides rendered hydrophobic by treatment thereof with the organodisilazanes are normally substantially more hydrophobic than similar oxides equivalently treated with organohalosilanes. Thus, such organodisilazane treated oxides are normally considerably more efficient on an equal surface structure concentration and weight basis, in imparting water-repellent properties to solid polymeric materials coated therewith. For a low density polyethylene film the application of a substantially uniform discontinuous monoparticulate coating of a pyrogenic 200 $M^2$/gram non-porous silica having reacted therewith about 5% by weight of hexamethyldisilazane will normally result in substantial water-repellent properties in the finished product.

The method of application of the colloidal hydrophobic oxide treating agent to the solid polymeric material surface(s) is generally not critical provided, of course, that substantial contact of the treating agent with said surface(s) is achieved. For purposes of ease and uniformity of application, however, we have found that dispersion of the metal oxide in an inert (with respect to the treating agent and intended polymeric material) volatile solvent provides an excellent system for subsequent application to the solid polymeric material surface(s).

Such dispersions may be applied by spraying, printing, etc. or may even be utilized as dip baths in which the solid polymeric articles may be submersed. Water; light hydrocarbons such as mineral spirits or isopentane, alcohols such as methyl, isopropyl, propyl butyl and pentyl alcohols and acetone have been found to generally constitute excellent solvent media which are usually inert both as to the hydrophobic oxides and the solid polymeric material surfaces to be treated and which are further benefited by their volatility. Needless to say, the solubility of the polymeric material to be treated in the contemplated solvent/dispersion should be fully considered.

There follow a number of illustrative, non-limiting examples:

Example 1

A polyvinylalcohol was solution cast into a film of about 15 mils in thickness. Three 4 x 5 inch rectangles are cut from the rough cast films. The first of said rectangular film sections remains untreated and serves as a control. The second of said film sections, however, is treated by dipping into a dry n-hexane dispersion containing as the dispersed phase about 2 wt. % of a colloidal pyrogenic silica having a BET—$N_2$ surface area of about 180 m.$^2$/gram, a primary particle diameter of about 0.015$\mu$, a porosity of less than about 2% and a hydroxyl group concentration of about 1.5 milliequivalents/gram. The third section is treated in the same manner as the second section with the exception that the silica component of the hexane dispersion is treated, prior to incorporation into the hexane, with hexamethyldisilazane. Infrared analysis of the solid reaction product indicates that said silica has, as a result of said treatment, chemically bound to the surface thereof about five percent by weight of the base silica of —$Si(CH_3)_3$ groups. Each of the dip treated polyvinyl alcohol film sections is then air dried for about 24 hours, thereby removing substantially completely the hexane solvent. The three polyvinyl alcohol film sections are then each weighted at one end thereof and charged into separate beakers filled with distilled, degassed, room temperature water. Immediately upon submergence it is noted that the third film, having on the surfaces thereof a coating of the hexamethyldisilazane treated silica, bears a striking silvery sheen thereover, suggesting the presence of a gas layer formed between the surfaces of the polymeric material and the water phase. The first untreated film and the second film treated with an equivalent amount of the untreated silica, however do not exhibit this phenomenon. Moreover, after submersion for about one hour with mild agitation, the first and second films are substantially completely dissolved while the third film remains substantially intact.

Example 2

One side of a clapboard sided house, located in an area of substantial air pollution, is primed and thereafter painted with two coats of a white acrylic latex exterior grade house paint having the following formulation:

| | Weight parts |
|---|---|
| Rhoplex AC–35 (a 46% aqueous dispersion of ethyl acrylate based polymer produced by Rohm and Haas Co., Phila., Pa.) | 498.5 |
| Talc | 205.8 |
| Rutile $TiO_2$ | 250.0 |
| $H_2O$ | 83.7 |
| Anionic dispersant | 12.6 |
| Wetting agent | 2.5 |
| Defoamer | 2.0 |
| Ethylene glycol | 25.0 |
| 57% Hg preservative | 1.8 |
| 2.5% Sol. hydroxyethylcellulose | 95.0 |
| Pine oil | 7.0 |
| 28% $NH_4OH$ | 2.0 |
| Total | 1185.0 |

About one day subsequent to the application of the finish coat there is applied to one-half of the siding about 1 quart/100 ft.$^2$ of siding surface of a dispersion consisting of wood alcohol as the liquid phase and about two percent by weight thereof of a treated silica similar to that employed in Example 1 as the solid phase. The remaining half of the painted siding is untreated. After about one year's exposure to the elements the siding is examined and it is found that the half thereof treated in accordance with the present invention is substantially cleaner and more stain-free than the untreated half.

Example 3

Marine grade mahogany plywood is cut into four approximately one foot squares. Next, one square each is finished with (1) a natural resin varnish, (2) a polyester based varnish, (3) a polyurethane based varnish, and (4) a nitrocellulose lacquer, respectively. Next, upon adequate drying or curing of the varnish and lacquer coatings, the squares are each masked off into three 4 inch strips. To the left hand strip of each of said squares there was applied by spraying about 15 c.c. of a dispersion consisting of isopropyl alcohol and about 2 weight percent thereof of a precipitated silica gel having an average particle diameter of about 19.5 millimicrons, a BET—$N_2$ surface area of about 150 $M^2$/gram and a porosity of about 20%. In addition, said silica had been previously reacted with about 3 percent by weight thereof of dimethyldichlorosilane. The center strips of each square are left untreated. The right hand strips are treated in a manner similar to the left hand strips with the notable exception that there is utilized a dispersion consisting of isopropanol and a two weight percent loading of hexamethyldisilazane treated pyrogenic silica of the type employed in Example 1. The thusly treated squares are then dried and placed, treated surfaces upward, under a spray tower. Water is then continuously sprayed thereupon at a total rate of about two gallons per minute. The center strips of each of the squares are noted to be wetted by the water as evidenced by filming of the water droplets sprayed thereon. The left hand strips, each having been treated with the dimethyldichlorosilane treated precipitated silica gel are somewhat water-repellent as evidenced by beading of the impinging water droplets; however, the beaded water droplets grow to substantial average size prior to run-off. The right hand strips, however, are noted to be extremely water-repellent as evidenced by the substantially immediate beading and run-off of the impinging water droplets. In addition, it is noted that the average beaded droplet size on the right hand strips is substantially smaller than those of the left hand strips. In large measure, this last phenomenon is believed due to the fact that superior water-repellency of the right hand side strips prevents substantial droplet growth on the treated surfaces prior to run-off therefrom.

Example 4

One side each of representative solid polymeric material sheets including natural cured rubber, carbon black reinforced butyl rubber, polymethyl methacrylate, polytetrafluoroethylene, radiation cross-linked low density polyethylene, polyvinylchloride, bisphenol-epichlorohydrin epoxy resin and phenol-formaldehyde resin are treated with a hexamethyldisilazane reacted silica of the type and in the manner utilized in Example 3. Samples of the thusly treated polymeric materials were then submersed in water-filled beakers. In each and every instance, the silica treated side of the samples are found to be extremely water-repellent and display the silvery optical phenomenon previously discussed in Example 1. The untreated sides of the samples, however, were substantially wetted out. Moreover, when said samples were withdrawn from the water, the treated sides thereof were substantially immediately dry while the untreated sides continued to bear significant water films thereover.

Referring now to the drawing, which it is to be noted, is merely for illustrative purposes and is thus not to be construed as properly scaled, it is believed that the optical phenomenon experienced and described in Examples 1 and 4 is due to the formation of an air layer between the water and the hydrophobic oxide coated polymeric surfaces. Accordingly, it is believed that the hydrophobic oxide particles 1 are sufficiently water-repellent to prevent the wetting thereof by water droplets 3. Thus, an effective water barrier is formed between polymeric material surfaces 5 and water droplets 3 by the hydrophobic metal or metalloid oxide particle coating even though discontinuities or spaces 7 between particles are present. It is further believed that the aforementioned air layer is located generally within said discontinuities 7 and is not displaced during submersion of the polymeric material in water.

What is claimed is:

1. A process for rendering a solid polymeric material surface water-repellent which comprises applying to said surface a discontinuous, substantially uniform coating of colloidal hydrophobic metal or metalloid oxide having an average ultimate particle diameter of less than about 0.5 micron, a porosity of less than about 10 percent and which oxide has chemically bound thereto at least about 0.5 weight percent thereof of surface structures conforming to the formula:

$$ZO\!-\!SiR_aX_b$$

wherein Z represents the oxide surface; O is oxygen; Si is silicon; each R is any alkyl, aryl, arylalkyl, alkylaryl, alkoxy, aryloxy, alkylaryloxy or arylalkoxy group; $a$ is an integer of from 2 to 3; each X is a halogen or hydroxy group; $b$ is an integer from 0 to 1 and $a+b=3$.

2. The process of claim 1 wherein said metal or metalloid oxide has an average ultimate particle diameter of less than about 0.1 micron.

3. The process of claim 1 wherein said metalloid oxide is a pyrogenic or precipitated silica.

4. The process of claim 3 wherein said metalloid oxide is pyrogenic silica.

5. The process of claim 1 wherein the concentration of said surface structures chemically bonded to the surface of said oxide represents at least about 4 percent by weight of said oxide.

6. The process of claim 1 wherein in the formula:

$$ZO\!-\!SiR_aX_b$$

each R is an alkyl group and $a$ is 3.

7. The process of claim 1 wherein said metal or metalloid oxide is rendered hydrophobic by reaction thereof with an organodisilazane.

8. The process of claim 1 wherein application of said colloidal hydrophobic metal or metalloid oxide to said surface is achieved by (a) providing said hydrophobic oxide as a disperson thereof in an inert volatile solvent; (b) applying said dispersion to the polymeric material surface; and (c) removing the solvent portion of said dispersion from the resulting treated surface.

9. The process of claim 8 wherein said solvent is an alcohol.

10. The process of claim 1 wherein said polymeric material is water soluble paper.

11. A solid polymeric material surface bearing thereon a substantially uniform, discontinuous coating consisting essentially of a colloidal hydrophobic metal or metalloid oxide having an average ultimate particle diameter of less than about 0.5 micron, a porosity of less than about 10 percent and which oxide has chemically bound thereto at least about 0.5 weight percent thereof of surface structures conforming to the formula:

$$ZO\!-\!SiR_aX_b$$

wherein Z represents the oxide surface; O is oxygen; Si is silicon; each R is any alkyl, aryl, arylalkyl, alkylaryl, alkoxy, aryloxy, alkylaryloxy or arylalkoxy group; $a$ is an integer of from 2 to 3; each X is a halogen or hydroxyl group; $b$ is an integer from 0 to 1 and $a+b=3$.

12. The coated polymeric material surface of claim 11 wherein said polymeric material is water soluble.

13. The coated polymeric material surface of claim 11 wherein said polymeric material is a paint, enamel, varnish, lacquer or shellac film.

14. The coated polymeric material surface of claim 13 wherein said polymeric material is an acrylic latex paint or enamel film.

15. The coated polymeric material surface of claim 11 wherein said hydrophobic oxide is a pyrogenic silica having an average ultimate particle diameter of less than about 0.1 micron and which bears chemically bonded to the surface thereof at least about 4 weight percent of said surface structures conforming to the formula:

$$ZO\!-\!SiR_aX_b$$

wherein each R is an alkyl group and $a$ is 3.

References Cited

UNITED STATES PATENTS 3,523,813  8/1970  Koller _____ 117—13

WILLIAM J. VAN BALEN, Primary Examiner

U.S. Cl. X.R.

117—45